United States Patent [19]

Vinton

[11] 3,896,894

[45] July 29, 1975

[54] MEANS TO TRANSMIT POWER ACROSS ARTICULATED VEHICLE HITCH POINT

[75] Inventor: David S. Vinton, Morton, Ill.

[73] Assignee: Caterpillar Tractor Co., Peoria, Ill.

[22] Filed: Jan. 24, 1973

[21] Appl. No.: 326,418

[52] U.S. Cl. .................. 180/51; 180/14 B; 74/385
[51] Int. Cl. ............................................. B60k 17/34
[58] Field of Search ........ 180/51, 14 B, 14 R, 6.54, 180/43 R, 43 A, 53 R, 53 C, 53 D; 64/18; 74/385

[56] References Cited
UNITED STATES PATENTS

| 1,200,438 | 10/1916 | Jocoby et al. | 180/6.54 |
|---|---|---|---|
| 2,219,533 | 2/1938 | Ross | 180/14 |
| 2,336,579 | 12/1943 | Venditty et al. | 64/18 |
| 2,427,710 | 9/1947 | Bush | 180/43 R |
| 3,527,315 | 10/1970 | Hampton | 180/51 |

FOREIGN PATENTS OR APPLICATIONS

| 961,653 | 6/1964 | United Kingdom | 180/51 |
|---|---|---|---|
| 919,514 | 9/1954 | Germany | 180/14 B |

Primary Examiner—David Schonberg
Assistant Examiner—Jack D. Rubenstein
Attorney, Agent, or Firm—Phillips, Moore, Weissenberger, Lempio & Strabala

[57] ABSTRACT

An articulated vehicle has a unit for transmitting power across the articulated hitch point thereof. Such unit includes a vertical shaft positioned along the axis of articulation, and having bevel gears on either end thereof. A drive shaft connects with the power plant of the vehicle and extends from one end of the vehicle to this vertical shaft. The drive shaft has a bevel gear mounted thereon which engages with one of the bevel gears of the vertical shaft. A shaft for driving the other end of the vehicle has a bevel gear thereon which engages with the other bevel gear on the vertical shaft. Power is transmitted from the drive shaft through the vertical shaft to the shaft for driving the other end of the vehicle, the vertical shaft and bevel gear arrangement meanwhile allowing articulation of the vehicle.

3 Claims, 3 Drawing Figures

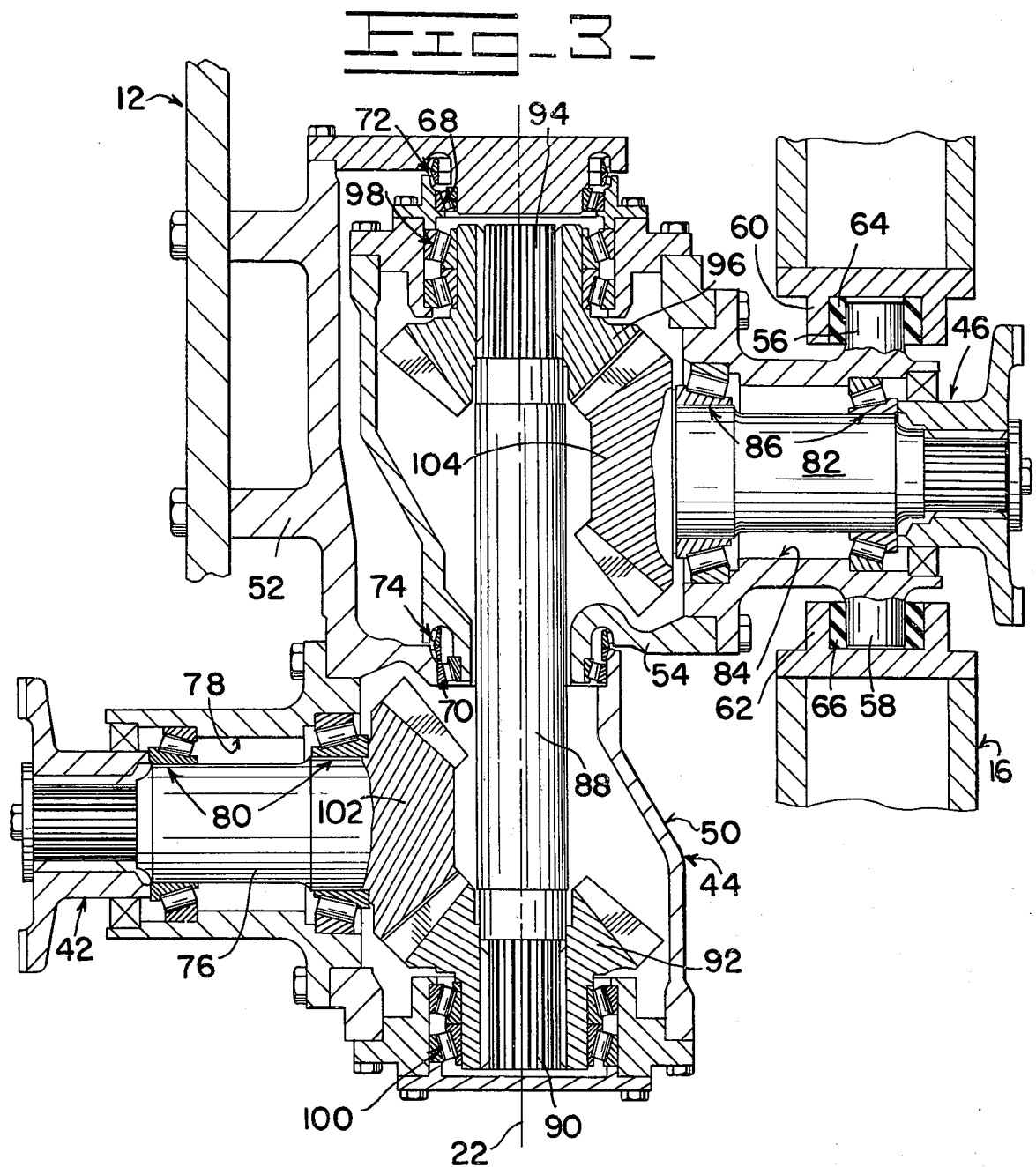

MEANS TO TRANSMIT POWER ACROSS ARTICULATED VEHICLE HITCH POINT

BACKGROUND OF THE INVENTION

This invention relates to apparatus for transmitting power across an articulated vehicle hitch point, and more particularly, to such apparatus which incorporates a vertical shaft and bevel gear arrangement for allowing such articulation, meanwhile transmitting power therethrough.

In transmitting power across the hitch joint of an articulated vehicle, certain problems exist. For example, it may be necessary to transfer the power at a very large angle of vehicle articulation (for example, up to 45°), and at a high shaft speed (for example, 3,600 rpm).

In general, articulated vehicles use universal joints as a means of transmitting power across the hitch. While the use of such universal joints has proved reasonably effective, it has been found that in general such universal joints are not capable of sustaining the loads involved in such a vehicle in combination with such high speed use and large angular deflection. In addition, in practice, such universal joints result in the power transmission means being of a relatively great length, resulting in poor space economy.

U.S. Pat. No. 2,306,958 to Kurti, U.S. Pat. No. 3,463,029 to Chow, U.S. Pat. No. 2,427,710 to Bush, and U.S. Pat. No. 1,200,438 to Jacobi et al. are of general interest in this area, in that each patent discloses a system for transmitting power across a pivoted joint. However, none of these patents deals with the transmission of power across the hitch point of an articulated vehicle, and the problems attendant thereto.

SUMMARY OF THE INVENTION

It is an object of this invention to provide means for transmitting power across an articulated vehicle hitch point which are effective for such transmission of power at a relatively large angle of vehicle articulation and a relatively high drive shaft speed.

It is a further object of this invention to provide means for transmitting power across an articulated vehicle hitch point which, while fulfilling the above object, are capable of effectively carrying the loads involved in the driving of such vehicle.

It is a further object of this invention to provide means for transmitting power across an articulated vehicle hitch point which, while fulfilling the above objects, are relatively simple in design and extremely effective in operation.

Broadly stated, the invention is in an articulated vehicle having one wheel-mounted frame portion connected to another wheel-mounted frame portion, the one frame portion being pivotable relative to the other frame portion about a generally vertical axis, and power means for rotating a first shaft associated with the one frame portion to drive the one frame portion. Such invention comprises power transfer means for driving a second shaft associated with the other frame portion to drive the other frame portion comprising a substantially vertical shaft supported relative to the vehicle and positioned with its longitudinal axis generally along the pivot axis of the one and the other frame portions, and rotatable about its longitudinal axis. A first bevel gear is connected to the bottom end of the substantially vertical shaft for rotation therewith. A second bevel gear is connected to the top end of the substantially vertical shaft for rotation therewith. A third bevel gear is connected to the first shaft for rotation therewith and in engagement with the first bevel gear. And, a fourth bevel gear is connected to the second shaft for rotation therewith, and in engagement with the second bevel gear, so that the power means rotate the first shaft and, through the first and third bevel gears, the substantially vertical shaft, and, through the second and fourth bevel gears, the second shaft to drive the other frame portion, meanwhile allowing articulation of the one frame portion relative to the other frame portion.

BRIEF DESCRIPTION OF THE DRAWINGS

These and other objects of the invention will become apparent from the study of the following specification and drawings, in which.

DESCRIPTION OF THE PREFERRED EMBODIMENT

Figure 1:
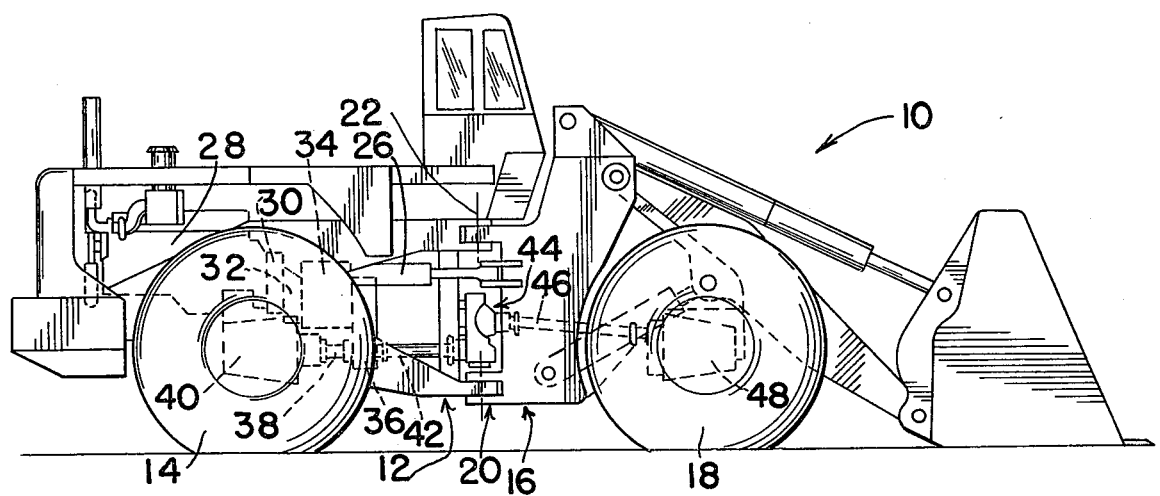
FIG. 1 is a side elevation of an articulated vehicle incorporating the invention.
Figure 2:
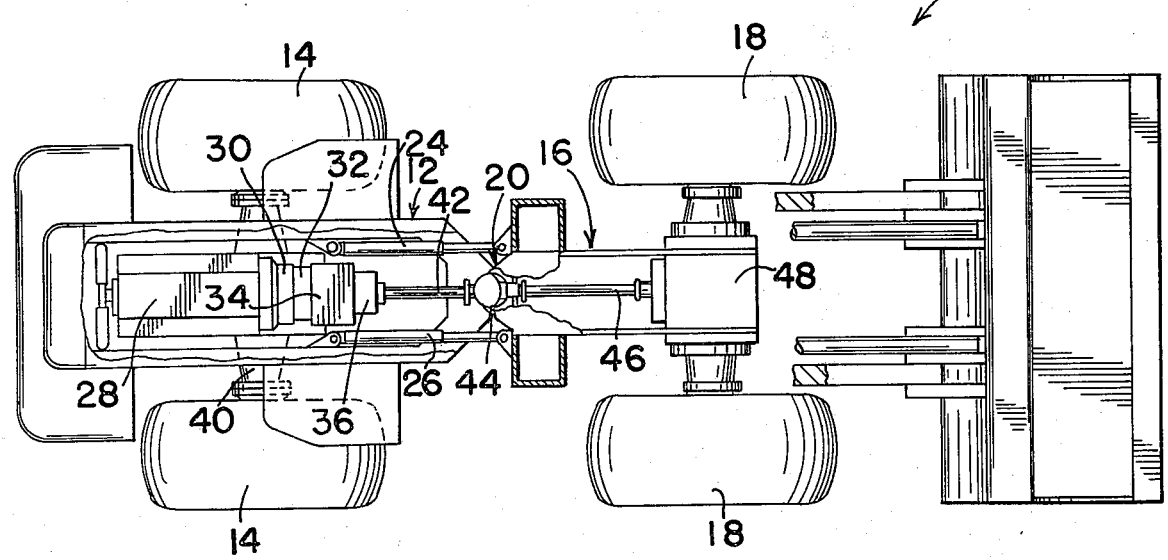
FIG. 2 is a plan view, partially broken away, of the articulated vehicle of FIG. 1; and, FIG. 3 is a sectional side elevation of the inventive power transfer means incorporated in the articulated vehicle of FIGS. 1 and 2.

Shown generally in FIGS. 1 and 2 is an articulated vehicle 10 having a rearward frame portion 12 mounted on wheels 14, and a forward loader frame portion 16, also mounted on wheels 18. The frame portions 12,16 are connected by a hitch joint 20 so as to permit pivoting of one frame portion relative to the other about a generally vertical axis 22. The vehicle 10 is steered by means of turning cylinders 24,26 which interconnect the frame portions 12,16, providing such articulation. Power means in the form of an engine 28 is mounted to the frame portion 12. The engine 28 connects with a converter drive box 30, which in turn connects with a converter 32 and a transmission 34. The engine 28 transmits power through these units and to a transfer box 36 attached to the transmission 34, and through a drive shaft 38 connected to a rear axle 40 to drive the frame portion 12.

Extending forwardly from the transfer box 36 and associated with the frame portion 12 is a shaft 42, which is also driven in the same manner as shaft 38. Such shaft 42 extends from the transfer box to power transfer means 44 for driving a shaft 46 which is associated with frame portion 16 for driving the frame portion 16 through a front axle 48.

Such power transfer means 44 include a casing 50 made up of a casing portion 52, and a casing portion 54 (FIG. 3). Casing portion 52 is bolted to frame portion 12 for movement therewith, and casing portion 54 is resiliently mounted to frame portion 16 by means of a trunnion assembly having oppositely extending pins 56,58 mounted on the casing portion 54 and resiliently mounted in a pair of trunnion supports 60,62 respectively, by means of rubber bushings 64,66.

The casing portion 52 is mounted to the casing portion 54 by means of bearings 68,70, so that the casing portions 52,54 are pivotable relative to each other about axis 22, i.e., the pivot axis of the frame portions 12,16. Seals 72,74 are included to prevent leaking of lubrication oil from the casing 50.

Fixed to shaft 42 as a part thereof is extended portion 76, which extends into a passage 78 defined by the casing portion 52. The extended portion 76 is supported by means of bearings 80 within the passage 78. Similarly, fixed to shaft 46 as a part thereof is extended portion 82 which extends into a passage 84 defined by the casing portion 54. Such extended portion 82 is supported by means of bearings 86 within passage 84.

A shaft 88 is disposed substantially vertically within the casing 50 and has fixed to its bottom end by means of a splined connection 90 a bevel gear 92. Shaft 88 has fixed to its top end, also by means of a splined connection 94, a bevel gear 96. The shaft 88 is supported in such substantially vertical attitude by means of bearings 98,100. In fact, the shaft 88 is positioned so that its longitudinal axis is generally along the pivot axis 22 of the frame portions 12,16, and is rotatable about its longitudinal axis.

Fixed to extended portion 76 of shaft 42 for rotation therewith is a bevel gear 102. Such bevel gear 102 is in engagement with bevel gear 92. Fixed to the extended portion 82 of shaft 48 for rotation therewith is a bevel gear 104, in engagement with bevel gear 96.

During operation of vehicle 10, the engine 28 rotates shaft 38 to drive the frame portion 12. Meanwhile shaft 42 also is rotated, and through the bevel gears 102 and 92, shaft 88 is also rotated. In turn, shaft 88, through bevel gears 96 and 104, rotates shaft 46 to drive frame portion 16. Meanwhile, because of the vertical placement of shaft 88 along the pivotal axis 22, and the bevel gear and casing arrangement, articulation of one frame portion relative to the other is allowed.

It is to be noted that, with the forward and rearward frame portions 12,16 generally aligned to allow the vehicle 10 to travel in a generally straight path, the shafts 42 and 46 extend generally parallel to the longitudinal axis of the vehicle 10. This allows a substantially great degree of vehicle 10 articulation, off such center position in either direction from center.

It has been found that, in the use of universal joints in this application, which must be capable of transmitting 12,000 foot lbs. of torque, two universal joints must be used to achieve 45° of articulation (each universal joint bending approximately 22°). In such case, the speed thereof is limited to 800 rpm. In order to achieve 3,600 rpm, each universal joint would be limited to 5° of bend, resulting in an articulation of about 10° maximum in such case.

In the present case, because of the particular arrangement described, it has been found that the unit is capable of handling a full 12,000 foot lbs. of torque, and is capable of full 45° articulation at 3,600 rpm rotative speed.

What is claimed is:

1. In an articulated vehicle having one wheel-mounted frame portion connected to another wheel-mounted frame portion, the frame portion being pivotable relative to the other frame portion about a generally vertical axis, and power means for driving the one frame portion and for rotating a first shaft associated with the one frame portion, power transfer means for driving a second shaft associated with the other frame portion to drive said other frame portion comprising:

a power transfer casing comprising a first casing portion connected to the one frame portion for movement therewith and defining a passage into which the first shaft extends, and a second casing portion, resilient means connecting said second casing portion to the other frame portion for movement therewith and pivotably connected to the first casing portion so as to be pivotable about an axis generally along the pivot axis of one and the other frame portions, and defining a passage into which the second shaft extends, lubricating oil disposed in said power transfer casing;

seal means/interconnecting and disposed between the first and second casing portions for providing sealing therebetween upon pivotal movement of the second casing portion relative to the first casing portion confining said lubricating oil within said power transfer casing;

means for rotatably supporting the first shaft within the passage of the first casing portion;

means for rotatably supporting the second shaft within the passage of the second casing portion;

a substantially vertical shaft supported totally within the power transfer casing and positioned with its longitudinal axis generally along the pivot axis of the one and the other frame portions and rotatable about its longitudinal axis;

a first bevel gear connected to one end of the substantially vertical shaft for rotation therewith;

a second bevel gear connected to the other end of the substantially vertical shaft for rotation therewith;

a third bevel gear connected to the first shaft for rotation therewith and in engagement with the first bevel gear;

a fourth bevel gear connected to the second shaft for rotation therewith and in engagement with the second bevel gear, so that the power means rotate the first shaft and, through the first and third bevel gears, the substantially vertical shaft, and, through the second and fourth bevel gears, the second shaft to drive the other frame portion, meanwhile allowing articulation of the one frame portion relative to the other frame portion, and said resilient means comprising substantially vertically disposed trunnion means on opposite sides of said second casing portion, resilient bushings disposed on the other frame portion receiving said trunnion means and said trunnion means being substantially parallel to and spaced from said vertical shaft.

2. The power transfer device of claim 1 wherein the one frame portion comprises the rearward frame portion of the vehicle, and the other frame portion comprises the forward frame portion of the vehicle.

3. The power transfer device of claim 2 wherein, with the forward and rearward frame portions generally aligned so that the vehicle may travel in a generally straight path, the first and second shafts extend generally parallel to the longitudinal axis of the vehicle.

* * * * *